US012717869B2

(12) United States Patent
Ideguchi

(10) Patent No.: US 12,717,869 B2
(45) Date of Patent: Aug. 25, 2026

(54) INFORMATION PROCESSING METHOD, SYSTEM, AND STORAGE MEDIUM FOR SETTING A MATRIX USED FOR LEARNING

(71) Applicant: NEC Corporation, Tokyo (JP)

(72) Inventor: Yuta Ideguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1071 days.

(21) Appl. No.: 17/794,007

(22) PCT Filed: Feb. 5, 2020

(86) PCT No.: PCT/JP2020/004318
§ 371 (c)(1),
(2) Date: Jul. 20, 2022

(87) PCT Pub. No.: WO2021/156968
PCT Pub. Date: Aug. 12, 2021

(65) Prior Publication Data
US 2023/0050883 A1 Feb. 16, 2023

(51) Int. Cl.
*G06F 17/16* (2006.01)
*G06F 18/22* (2023.01)

(52) U.S. Cl.
CPC .............. *G06F 17/16* (2013.01); *G06F 18/22* (2023.01)

(58) Field of Classification Search
CPC .......... G06F 17/15; G06F 17/16; G06F 18/22; G06N 20/00; G06N 3/08
See application file for complete search history.

(56) References Cited

U.S. PATENT DOCUMENTS

2012/0296900 A1 11/2012 Kalai et al.
2021/0049665 A1* 2/2021 Roy Chowdhury ......................... G06Q 30/0633
2022/0108358 A1* 4/2022 Sun .................... G06Q 30/0631

FOREIGN PATENT DOCUMENTS

JP 2010-061513 A 3/2010

OTHER PUBLICATIONS

Ning, Xia, and George Karypis. “Sparse linear methods with side information for top-n recommendations.” Proceedings of the sixth ACM conference on Recommender systems. 2012. (Year: 2012).*
(Continued)

*Primary Examiner* — Matthew D Sandifer

(57) ABSTRACT

An information processing system according to the present invention is an information processing system that sets a weight matrix. The weight matrix is generated by learning using a target matrix that is a matrix including an action status on an item in each of a plurality of setting statuses as an element of a column, includes a weight corresponding to an intersection of items as an element, and is multiplied by the target matrix. The information processing system includes: a similarity degree calculating unit configured to extract, from each column of the target matrix, some elements from among all elements of the column, and calculate a degree of similarity between the items based on the some elements of the each column; and a weight matrix setting unit configured to set the weight matrix that is a sparse matrix including a nonzero element based on the degree of similarity.

20 Claims, 16 Drawing Sheets

(56) References Cited

OTHER PUBLICATIONS

Cheng, Yao, Liang Yin, and Yong Yu. "LorSLIM: low rank sparse linear methods for top-n recommendations." 2014 IEEE International Conference on Data Mining. IEEE, 2014. (Year: 2014).*
Steck, Harald, et al. "Admm slim: Sparse recommendations for many users." Proceedings of the 13th international conference on web search and data mining. 2020. (Year: 2020).*
International Search Report for PCT Application No. PCT/JP2020/004318, mailed on Apr. 7, 2020.
Xia Ning and George Karypis, Slim: Sparse Linear Methods for Top-N Recommender Systems, 2011 IEEE 11th International Conference on Data Mining, pp. 497-506, IEEE, 2011.
Noriaki Kawamae et al., Extracting User's Preference and Selecting Users in Collaborative Filtering, vol. 2003, No. 71, pp. 467-473, Chapter 3, IPSJ SIG Technical Reports 2003.

* cited by examiner

=

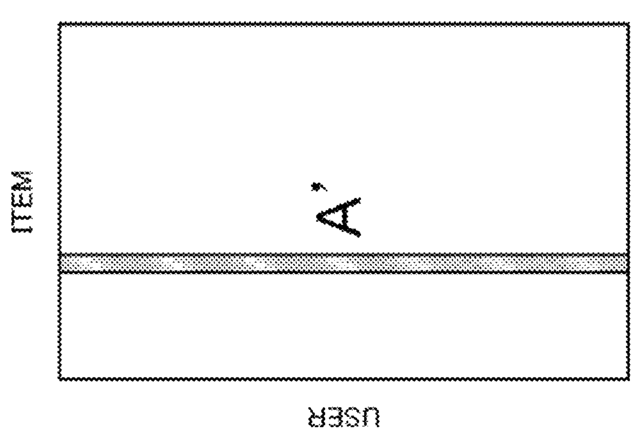
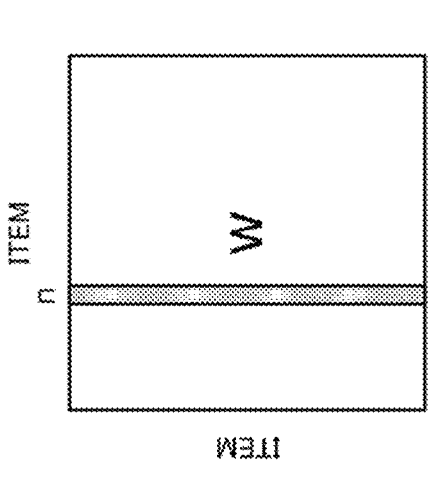
Fig.3B
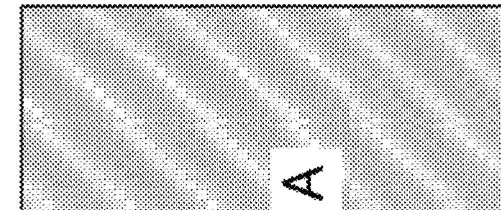
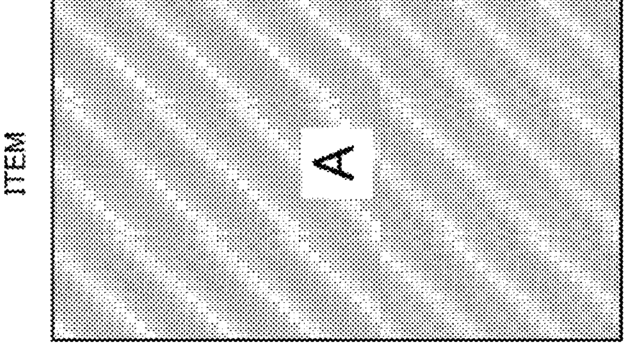

=

×

ITEM
USER
a'
b

INFORMATION PROCESSING METHOD, SYSTEM, AND STORAGE MEDIUM FOR SETTING A MATRIX USED FOR LEARNING

This application is a National Stage Entry of PCT/JP2020/004318 filed on Feb. 5, 2020, the contents of all of which are incorporated herein by reference, in their entirety.

TECHNICAL FIELD

The present invention relates to an information processing method for setting a matrix used for learning, an information processing system, and a program.

BACKGROUND ART

As a method for recommending an item to a user, a model is built by learning actions such as selection and use of items by a plurality of users in the past, and unobserved values of the actions by the users are predicted. For example, a website to sell products on online service recommends products to the users, and a website to distribute videos recommends movies to the users. However, when generating a model that predicts the actions by the users as described above, it is required to learn a large amount of data, and it becomes an issue to shorten the learning time.

As a proposed technique for shortening the learning time when learning a model that recommends an item as described above, there is a method called Sparse Linear Method (SLIM) described in Non-Patent Document 1. Specifically, in the SLIM, a "user-item matrix" that is previously measured data is prepared first as shown on the left side in FIG. 1. For example, item is "movie", and "1" is set for a movie that the user has watched and "0" is set for a movie that the user has not watched as the element of the matrix. That is to say, it is arranged in each column of the "user-item matrix" whether or not a plurality of users have watched each item, which is configured as a sparse matrix. Then, by using a learned model as will be described later, a user-item matrix as shown on the right side in FIG. 1 is predicted from the user-item matrix on the left side in FIG. 1, and is used in such a manner that a "movie" with an element having turned to "1" from "0" is recommended to the user.

Specifically, the learning is performed to generate an interitem weight matrix w to be multiplied by a user-item matrix A, which is a sparse matrix, so as to allow prediction of a dense user-item matrix A' that is substantially identical to the user-item matrix A from the user-item matrix A as shown in FIG. 2. At the time, in the learning, calculation can be performed independently on the respective items because there is no dependence between the respective items. For example, calculation on an item a with the user-item matrix A as shown by hatching in FIG. 3A and calculation on an item n with the user-item matrix A as shown by hatching in FIG. 3B can be performed independently.

In the SLIM, the learning time is shortened by setting the interitem weight matrix w as a sparse matrix at time of the abovementioned learning. Specifically, in the SLIM, as shown in FIGS. 4A and 4B, only an element corresponding to the intersection of a specific item (illustrated in black) and each similar item (illustrated by hatching) is set in the weight matrix w as shown by hatching. That is to say, in the SLIM, in the weight matrix w, all the elements corresponding to the intersections of items are not set as nonzero elements, but only the elements corresponding to the intersections of items determined to be similar to each other are set as nonzero elements and the others are set as zero elements.

In order to select items that are similar to each other, it is required to calculate all the degrees of similarity between items. For example, as the degree of similarity between items, the cosine similarity or distance between elements in columns of the respective items in the user-item matrix are calculated and used. Specifically, as shown in the upper view of FIG. 5 as an example, the degrees of similarity between column-a elements representing actions by all the users on an item a and column-b elements representing actions by all the users on an item b are calculated, and the calculated degrees of similarity are stored in appropriate locations in the item-item matrix. When actually calculating the degree of similarity, as shown in the lower view of FIG. 5, one specific column (for example, column a) in the user-item matrix is selected to calculate the degrees of similarity between the specific column and the respective other columns, and moreover, the specific column is changed to calculate all the degrees of similarity between the items. Consequently, the degrees of similarity are stored in all the elements of the item-item matrix. As the degree of similarity between identical items, a value representing that the items are identical such as a value "1" is set, for example.

Then, the degrees of similarity to the other items calculated for each specific item as shown by a graph of the upper view of FIG. 6 are sorted in descending order of the degree of similarity as shown by a graph of the lower view of FIG. 6, and some items are selected as items that are similar to the specific item based on a preset threshold value. For example, top some items are selected in descending order of the degree of similarity, or items indicating the degree of similarity equal to or more than a preset value are selected. After that, in the weight matrix w, only the elements corresponding to the intersections of the selected specific item and similar items are set as nonzero elements, and the other elements are set as zero elements.

Non-Patent Document 1: Xia Ning and George Karypis. Slim: Sparse Linear Methods for Top-N Recommender Systems. In 2011 IEEE 11th International Conference on Data Mining, pages 497-506. IEEE, 2011.

However, in the SLIM described above, it takes much time to calculate the degrees of similarity between items. Therefore, there arises a problem that the learning time at the time of generating a model that predicts a user's action cannot be further shortened. Such a problem also occurs at the time of learning a model that calculates a prediction value of an item not only to the user but also to every setting status.

SUMMARY

Accordingly, an object of the present invention is to provide an information processing method which can solve the abovementioned problem that the learning time in the case of learning a model that calculates a prediction value of an item to a predetermined setting status cannot be further shortened.

An information processing method as an aspect of the present invention is an information processing method for setting a weight matrix. The weight matrix is generated by learning using a target matrix that is a matrix including an action status on an item in each of a plurality of setting statuses as an element of a column, includes a weight corresponding to an intersection of items as an element, and is multiplied by the target matrix. The information processing method includes: extracting, from each column of the target matrix, some elements from among all elements of the column, and calculating a degree of similarity between the items based on the some elements of the each column; and setting the weight matrix that is a sparse matrix including a nonzero element based on the degree of similarity.

Further, an information processing system as an aspect of the present invention is an information processing system that sets a weight matrix. The weight matrix is generated by learning using a target matrix that is a matrix including an action status on an item in each of a plurality of setting statuses as an element of a column, includes a weight corresponding to an intersection of items as an element, and is multiplied by the target matrix. The information processing system includes: a similarity degree calculating unit configured to extract, from each column of the target matrix, some elements from among all elements of the column, and calculate a degree of similarity between the items based on the some elements of the each column; and a weight matrix setting unit configured to set the weight matrix that is a sparse matrix including a nonzero element based on the degree of similarity.

Further, a program as an aspect of the present invention includes instructions for causing an information processing apparatus setting a weight matrix to realize a similarity degree calculating unit and a weight matrix setting unit. The weight matrix is generated by learning using a target matrix that is a matrix including an action status on an item in each of a plurality of setting statuses as an element of a column, includes a weight corresponding to an intersection of items as an element, and is multiplied by the target matrix. The similarity degree calculating unit is configured to extract, from each column of the target matrix, some elements from among all elements of the column, and calculate a degree of similarity between the items based on the some elements of the each column. The weight matrix setting unit is configured to set the weight matrix that is a sparse matrix including a nonzero element based on the degree of similarity.

With the configurations as described above, the present invention can further shorten the learning time in the case of learning a model that calculates a prediction value of an item to a predetermined setting status.

BRIEF DESCRIPTION OF DRAWINGS

FIG. 3B is a view showing an image of processing associated with learning of the user-item matrix;

EXAMPLE EMBODIMENTS

First Example Embodiment

Figure 7:
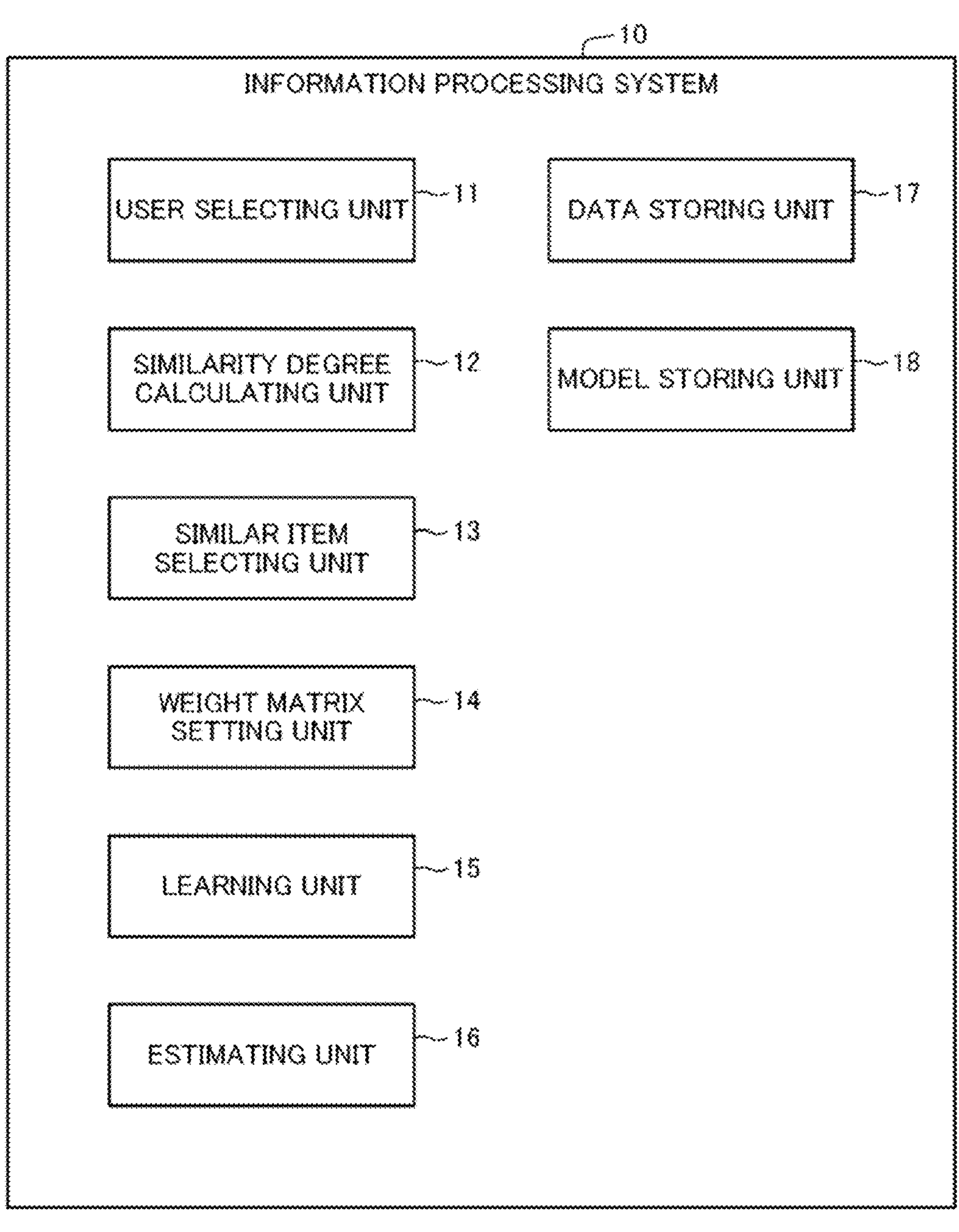
FIG. 7 is a block diagram showing a configuration of an information processing system in a first example embodiment of the present invention.
Figure 8A:
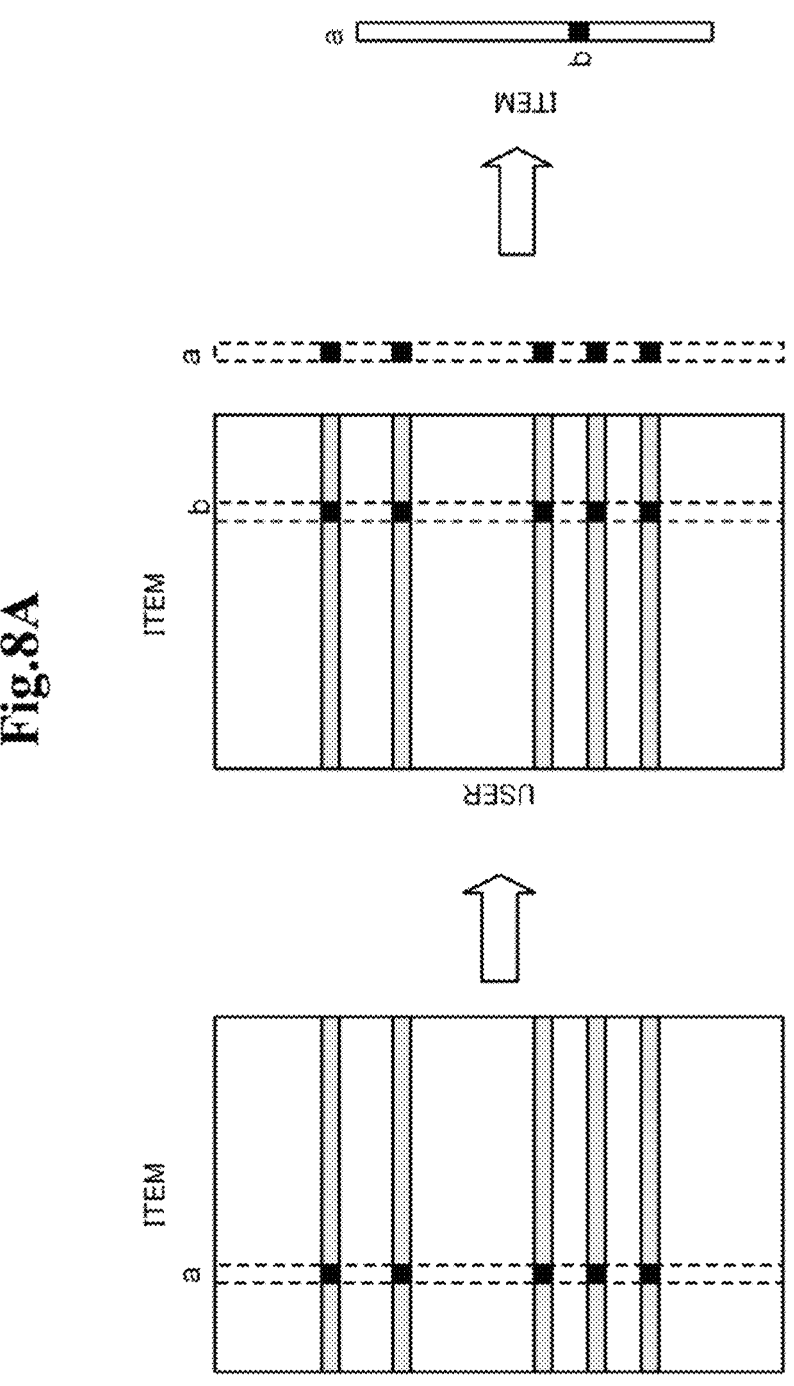
FIG. 8A is a view showing an image of processing by the information processing system disclosed in FIG. 7.
Figure 8B:
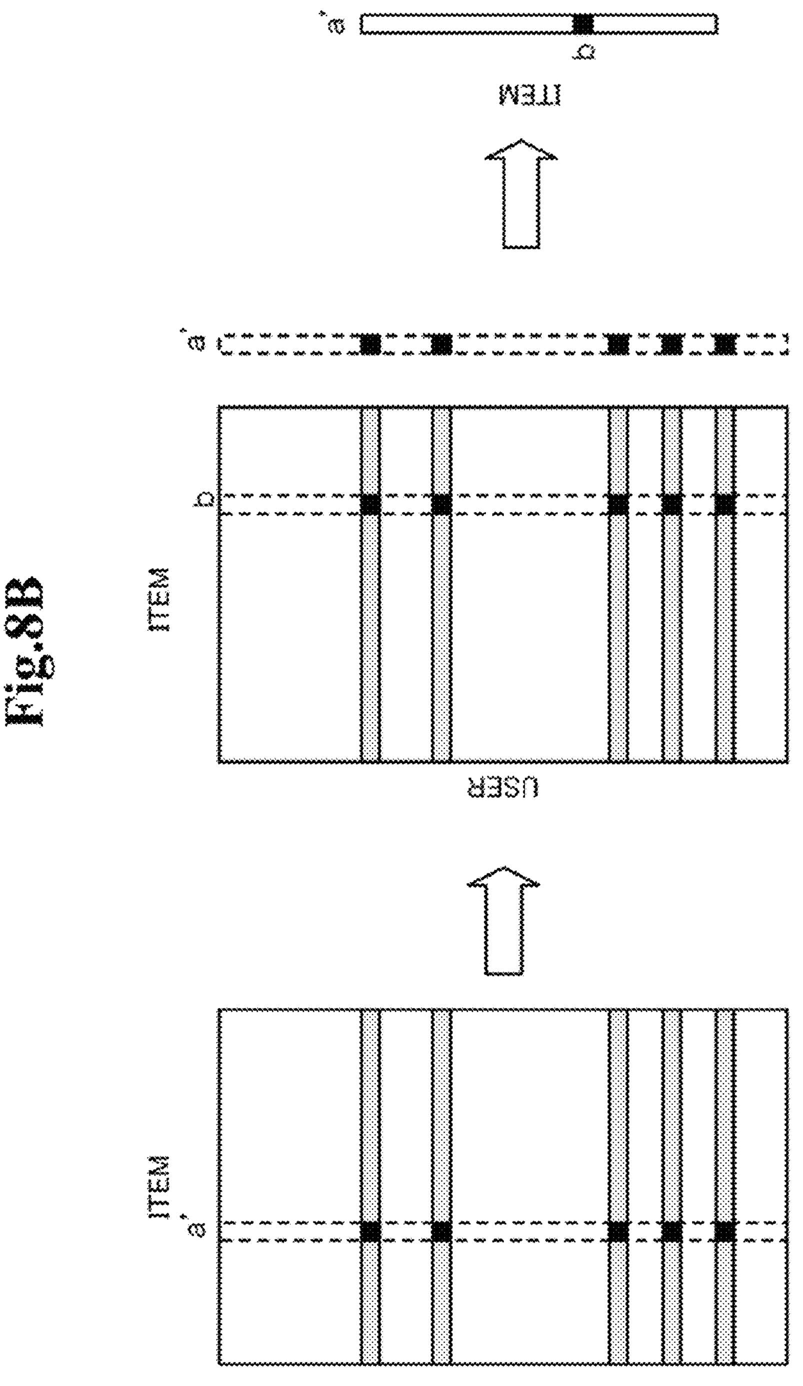
FIG. 8B is a view showing an image of processing by the information processing system disclosed in FIG. 7.
Figure 9:
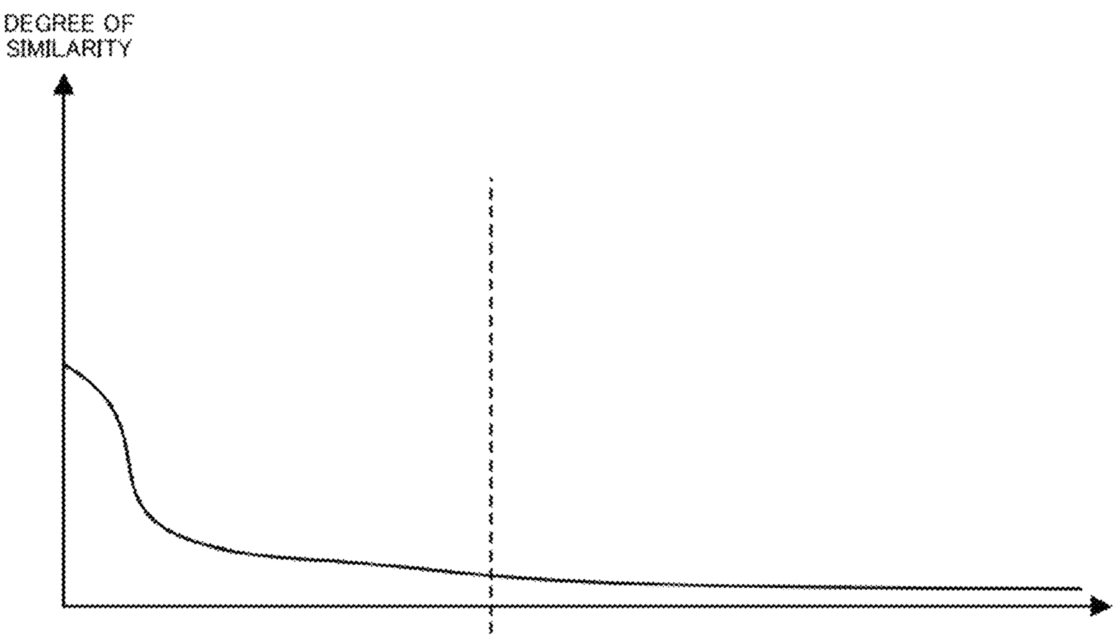
FIG. 9 is a view showing an image of processing by the information processing system disclosed in FIG. 7.
Figure 9:
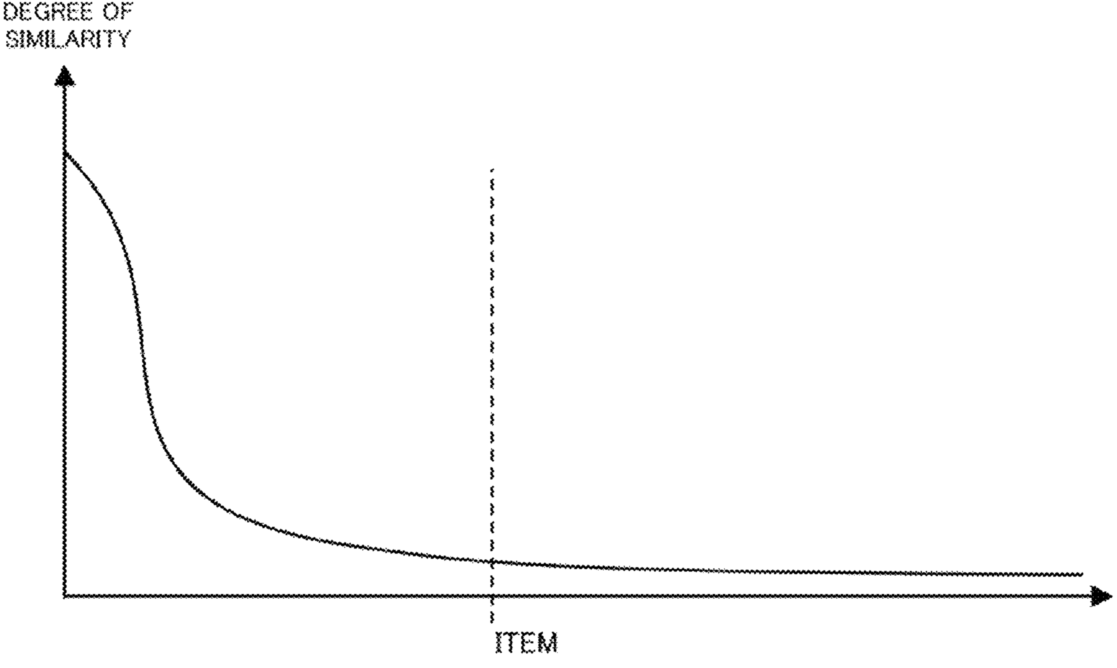
Figure 10:
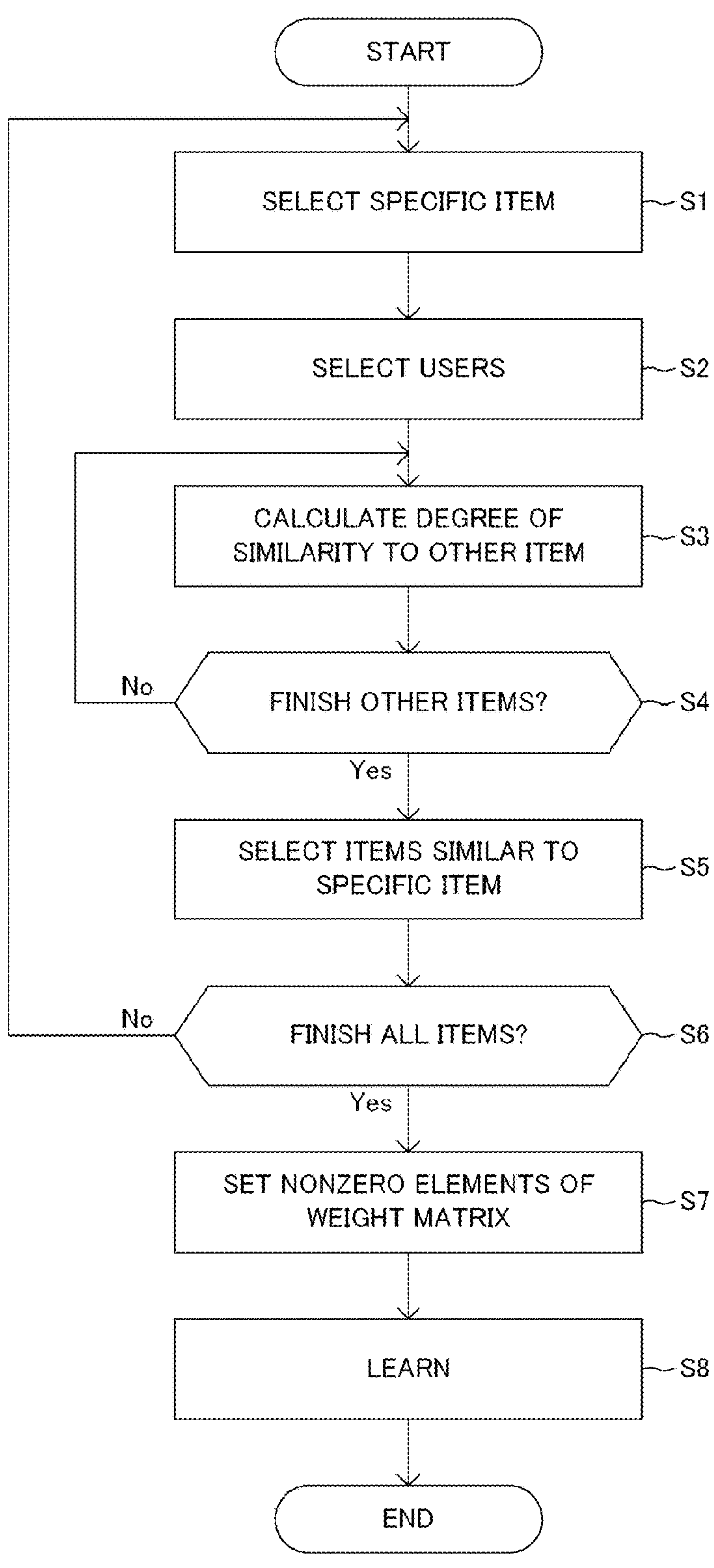
FIG. 10 is a flowchart showing an operation of the information processing system disclosed in FIG. 7.

A first example embodiment of the present invention will be described with reference to FIGS. 7 to 10. FIG. 7 is a view for describing a configuration of an information processing system, and FIGS. 8 to 10 are views for describing a processing operation of the information processing system.

[Configuration]

Figure 1:
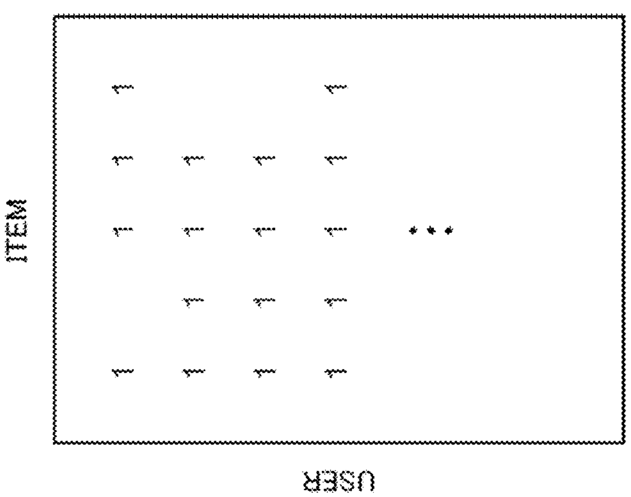
FIG. 1 is s view showing an example of a user-item matrix.
Figure 1:
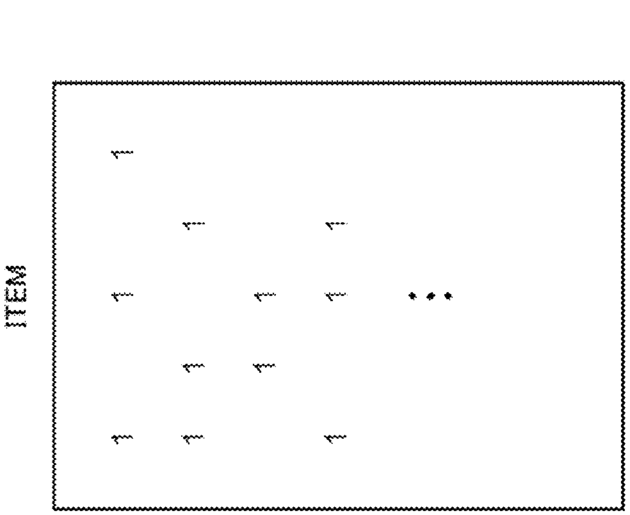

An information processing system 10 in this example embodiment has a function of building a model that recommends items to users by learning, and also has a function of performing preprocessing before learning. Herein, a target matrix, which is data used for learning in this example embodiment, is the “user-item matrix” described with reference to FIG. 1. The user-item matrix is a sparse matrix in which the statuses of the presence/absence of action by a plurality of users for each item are arranged in the column direction and, as elements, “0” and “1” are set. As an example, it is assumed that an item is “movie” and, as elements, “1” is set for a movie that the user has watched and “0” is set for a movie that the user has not watched.

However, the target matrix that is the data to be processed at the time of learning by the information processing system 10 is not necessarily limited to the abovementioned user-item matrix. For example, the item is not limited to “movie”, and may be any item such as “product”. Moreover, the user’s action is not limited to whether or not the user has watched, and may be any action status. As an example, the item may be “product”, and the user’s action may be whether or not the user has purchased. Moreover, the user’s action is not necessarily limited to be distinguishable based the presence/absence of the action, and therefore, the values of elements are not limited to being indicated by binary values “0” and “1”. For example, in a case where the content of the user’s action indicates the level of an action on an item such as the ratio of the watching time to the total time of a movie and the number of times of watching a movie, multiple values are set to elements to be nonzero elements. Moreover, “user” as entries set in the column direction in the target matrix is an example, and another setting status may be set instead of user. For example, the target matrix may be such that a plurality of “time” and “place” are set as entries in the column direction instead of user and the presence or absence of action or the level of action in each “time” and each “place” on item are as elements.

The information processing system 10 is configured by one or a plurality of information processing apparatuses including an arithmetic logic unit and a storage unit. As shown in FIG. 7, the information processing system 10 includes a user selecting unit 11, a similarity degree calculating unit 12, a similar item selecting unit 13, a weight matrix setting unit 14, a learning unit 15, and an estimating unit 16. The functions of the user selecting unit 11, the similarity degree calculating unit 12, the similar item selecting unit 13, the weight matrix setting unit 14, the learning unit 15, and the estimating unit 16 can be realized by execution of a program for realizing the respective functions stored in the storage unit by the arithmetic logic unit. The information processing system 10 also includes a data storing unit 17 and a model storing unit 18. The data storing unit 17 and the model storing unit 18 are configured by the storage unit. Below, the respective components will be described in detail.

First, the user selecting unit 11, the similarity degree calculating unit 12, the similar item selecting unit 13 and the weight matrix setting unit 14 mentioned above will be described. These units have a function of, as the abovementioned preprocessing before learning of the user-item matrix, calculating the degree of similarity between items and setting a weight matrix in which only an element corresponding to the intersection of items selected in accordance with the degree of similarity is set as a nonzero element. It is assumed that the user-item matrix is stored in advance in the data storing unit 17.

The user selecting unit 11 (similarity degree calculating unit) retrieves the user-item matrix from the data storing unit 17, and first selects one item as a "specific item". Herein, "item a" is selected as the specific item. Then, the user selecting unit 11 selects some users from among users corresponding to all the elements of columns of the item a. For example, as shown in the left view of FIG. 8A, the user selecting unit 11 selects only users indicated in gray from among the elements of the column of the item a. At the time, the user selecting unit 11 extracts users with elements of value "1", that is, nonzero elements among the elements of the column of the item a, and further selects only some of the users. For example, the user selecting unit 11 extracts users with elements of value "1" among the elements of the column of the item a, and selects any users at a predetermined ratio (for example, 20%) to the number of all the users from among the extracted users. Consequently, only some elements of the elements of the column of the item a are selected as indicated by black locations in the column of the item a in FIG. 8A.

The user selecting unit 11 is not necessarily limited to selecting some users in a column corresponding to a specific item as described above. For example, the user selecting unit 11 may select all the users with elements of value "1" among the elements of the column of a specific item, or may select some users at random.

The similarity degree calculating unit 12 (similarity degree calculating unit) compares some elements of the column of the item a that is the specific item extracted as described above with some elements of the column of another item, and calculates the degree of similarity between the specific item and the other item. FIG. 8A shows an example of a process of calculating the degree of similarity between the item a that is the specific item and the item b that is the other item. At the time, as shown in the middle view of FIG. 8A, the similarity degree calculating unit 12 extracts, from among the elements of the column of the item b that is the other item, elements corresponding to the same users as the users selected for the item a that is the specific item described above. Then, the similarity degree calculating unit 12 calculates the degrees of similarity between the extracted elements of the item a and the extracted elements of the item b as indicated by black spots in FIG. 8A. For example, the similarity degree calculating unit 12 calculates the cosine similarity, distance and the like between the extracted elements of the item a and the extracted elements of the item B to calculate as the degree of similarity between the item a and the item B. In this example embodiment, the similarity degree calculating unit 12 calculates, as the degree of similarity, the number of elements for which the value "1" is set and which correspond to the same user among the extracted elements of the item a and the extracted elements of the item b. Then, as shown by a black spot in the right view of FIG. 8A, the similarity degree calculating unit 12 stores the calculated degree of similarity as the degree of similarity between the item a and the item b.

Then, the similarity degree calculating unit 12 changes the other item to still another item, and calculates the degree of similarity between the specific item and the still other item. That is to say, the similarity degree calculating unit 12 keeps the item A as the specific item, selects still another item (for example, item c) that is different from the previously selected item b, and calculates the degree of similarity between the elements of the item a and the elements of the still other item c. At the time, the similarity degree calculating unit 12 extracts elements corresponding to the same users as the users selected for the item a from among the elements of the still other item c having been selected. Then, the similarity degree calculating unit 12 calculates the degrees of similarity between the extracted elements of the item a and the extracted elements of the item c, and stores as the degree of similarity between the item a and the item c.

Then, the similarity degree calculating unit 12 calculates the degree of similarity between the items as described above until there are no other items to compare with the specific item a. That is to say, the similarity degree calculating unit 12 calculates and stores the degree of similarity between the specific item a and each of all the other items.

Figure 6:
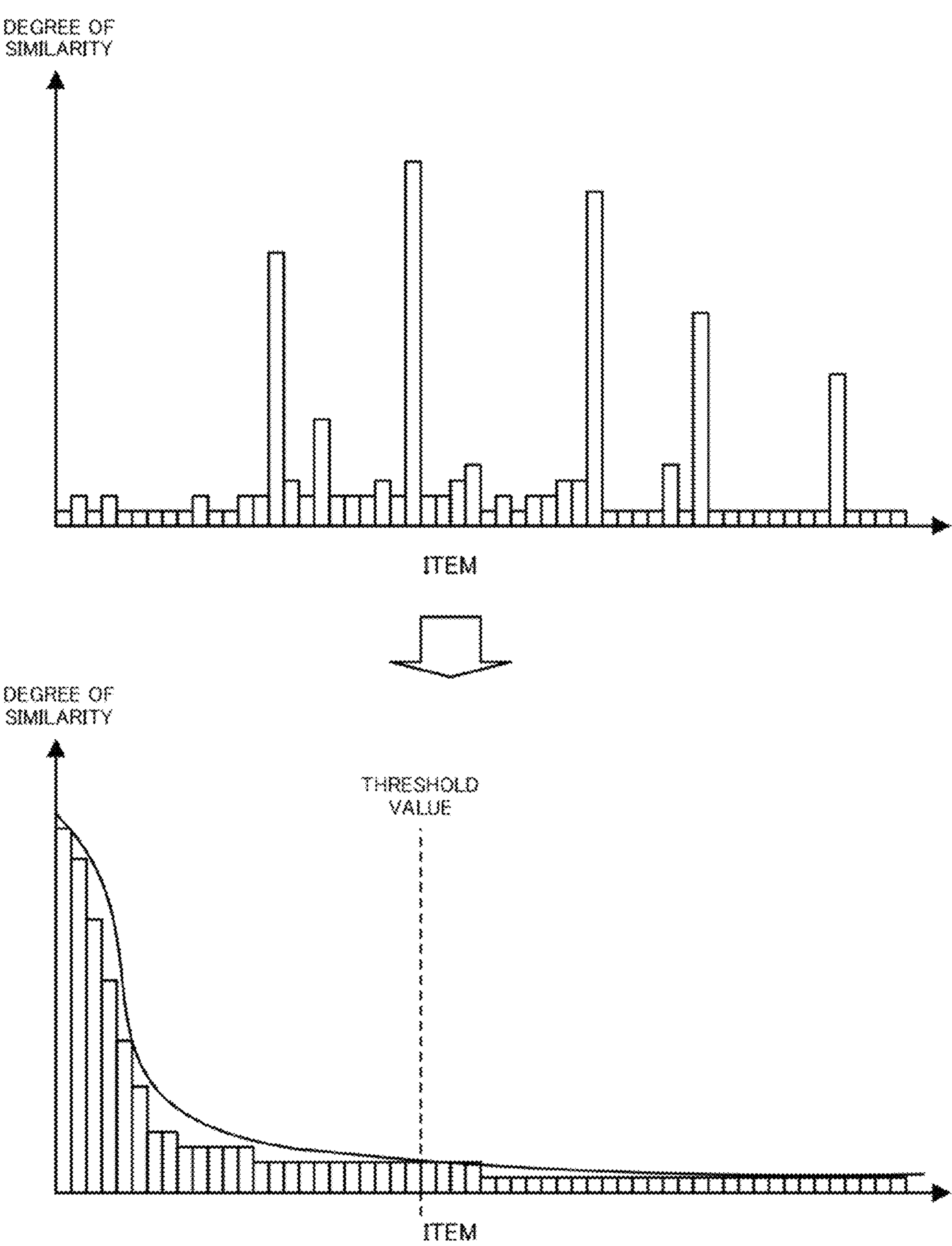
FIG. 6 is a view showing an image of processing associated with learning of the user-item matrix.

The similar item selecting unit 13 (similarity degree calculating unit) selects another item similar to the specific item a based on the degrees of similarity calculated as described above. For example, as described with reference to FIG. 6 before, the similar item selecting unit 13 sorts the degrees of similarity of the other items to the specific item a in descending order as shown in the upper view of FIG. 9, and selects some of the items as items similar to the specific item with reference to a preset threshold value indicated by a dotted line. Herein, the similar item selecting unit 13 selects the items located on the left side of the threshold value as the items similar to the specific item in the same manner as described before. In this example embodiment, in the same manner as described before, the similarity degree calculating unit 13 selects some users, and calculates, as the degree of similarity, the number of elements for which the value "1" is set and which correspond to the same user among the extracted elements of the item a and the extracted elements of the item b. Therefore, compared with the case of calculating the number of users with the identical elements covering all the users as the degree of similarity as shown in the lower view of FIG. 9, the values of the degrees of similarity are low as a whole in this example embodiment.

Further, the user selecting unit 11, the similarity degree calculating unit 12, and the similar item selecting unit 13 change the specific item, calculate the degrees of similarity of the respective other items to the post-change specific item, and select similar items to the post-change specific item. Specifically, after selecting items similar to the specific item a as described above, the user selecting unit 11 selects one item a' different from the specific item a as the post-change specific item a' as shown in the left view of FIG. 8B. Then, the user selecting unit 11 selects some users from among the users corresponding to all the elements in the column of the specific item a'. For example, as shown in the left view of FIG. 8B, the user selecting unit 11 selects only users indicated in gray from among the elements in the column of the specific item a'. At the time, the user selecting unit 11 extracts users corresponding to elements with value “1”, that is, nonzero elements from among the elements in the column of the item a', and further selects only some users therefrom. For example, the user selecting unit 11 extracts users corresponding to elements with value “1” from among the elements in the column of the item a', and selects any users at a predetermined ratio (for example, 20%) to all the users from among the extracted users. Moreover, at the time, the user selecting unit 11 selects users different from the users selected at the time of calculating the degree of similarity for the pre-change specific item a. Consequently, as shown by black spots in the column of the specific item a' in FIG. 8B, only some of the elements in the column of the post-change item a'. However, the user selecting unit 11 is not limited to, when selecting users for the specific item a', selecting uses completely different from the users selected for the pre-change specific item a, and may select some or all of the users.

Then, in the same manner as described above, the similarity degree calculating unit 12 compares some elements in the column of the item a' that is the post-change specific item with some elements in the column of another item that is different from the item a', and calculates the degree of similarity between the specific item a' with the other item. After that, in the same manner as described above, the similar item selecting unit 13 selects an item similar to the specific item a' based on the calculated degree of similarity.

Then, the user selecting unit 11, the similarity degree calculating unit 12, and the similar item selecting unit 13 calculate all the degrees of similarity between the items and, until finishing selecting similar items for all the items, change the specific item to repeat the abovementioned processing. At the time, it is desirable that users different from previously selected users are selected every time the specific item is changed, but some or all of the previously selected users may be selected.

Figure 4A:
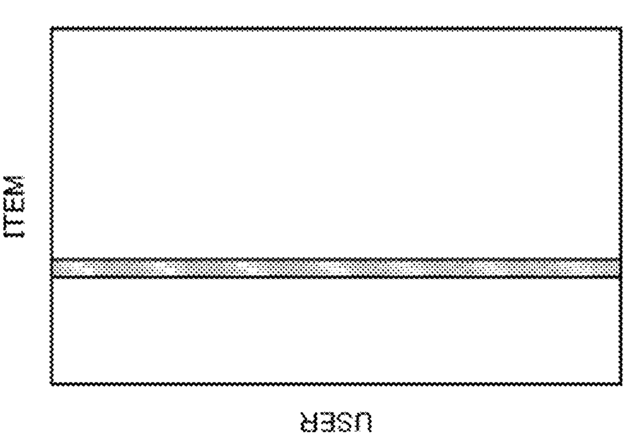
FIG. 4A is a view showing an image of processing associated with learning of the user-item matrix.
Figure 4A:
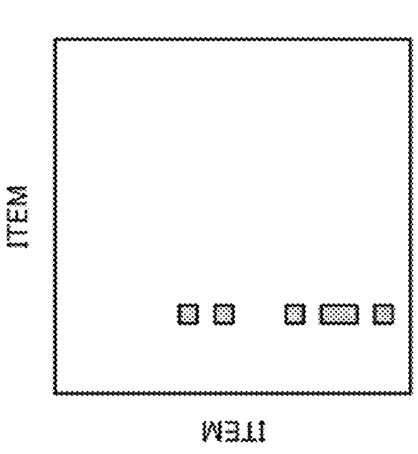
Figure 4A:
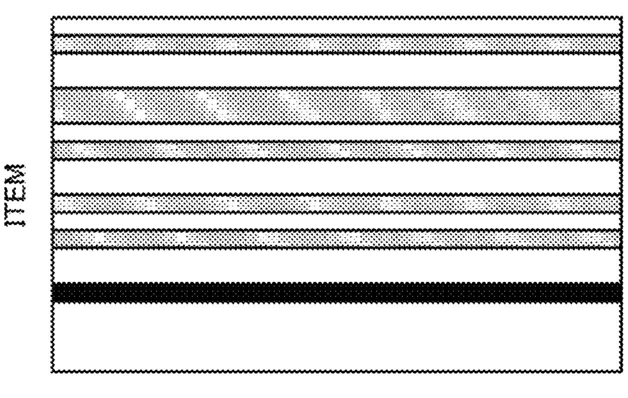
Figure 4B:
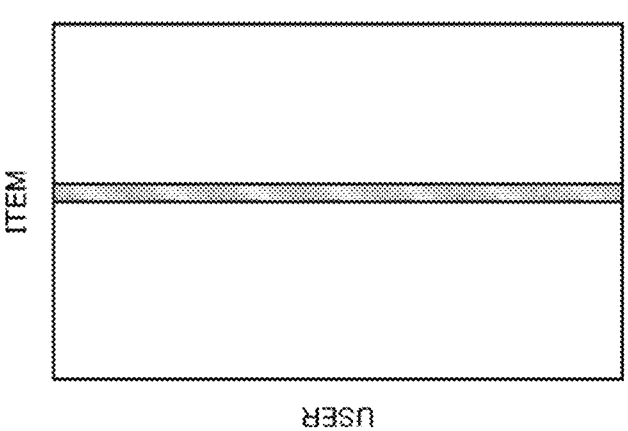
FIG. 4B is a view showing an image of processing associated with learning of the user-item matrix.
Figure 4B:
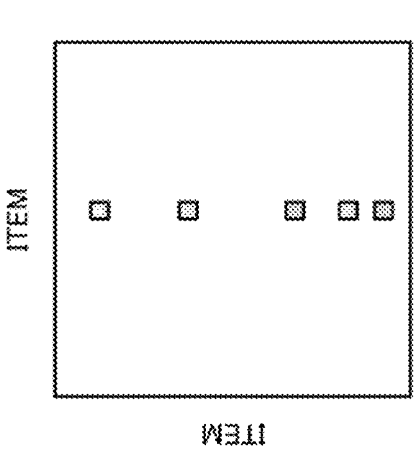
Figure 4B:
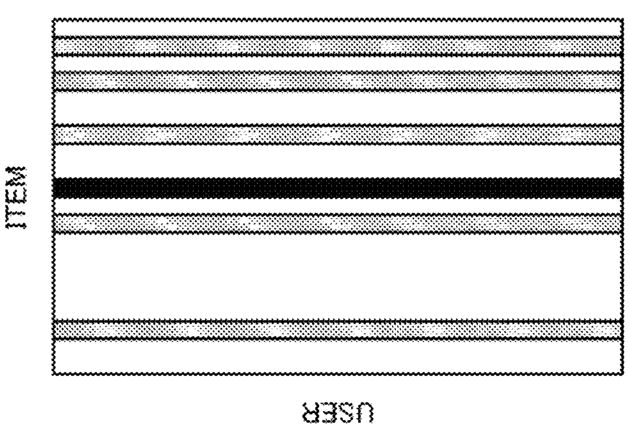
Figure 5:
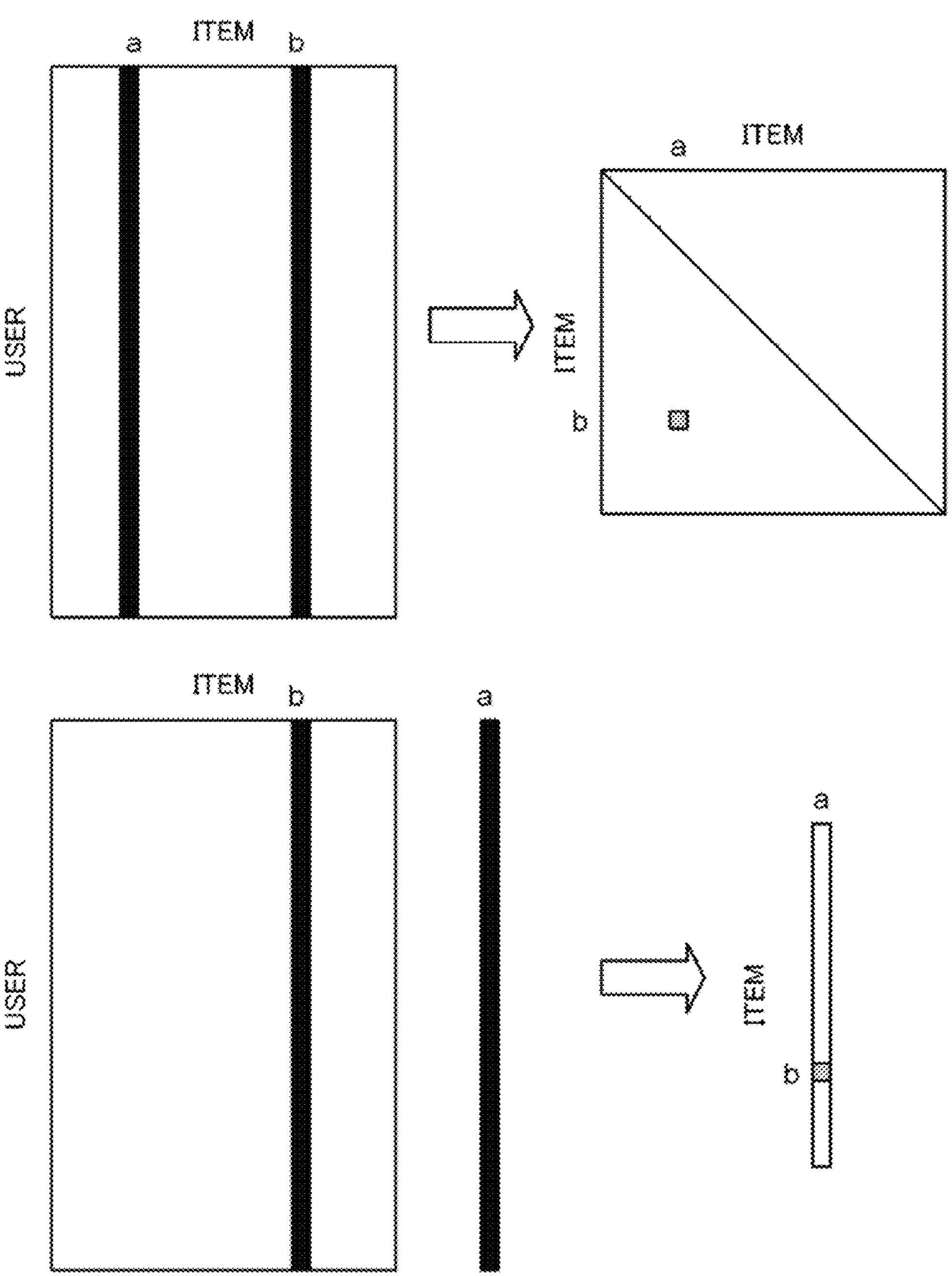
FIG. 5 is a view showing an image of processing associated with learning of the user-item matrix.

The weight matrix setting unit 14 (weight matrix setting unit) sets a zero element and a nonzero element of a weight matrix based on the degree of similarity between items calculated as described above. Herein, the weight matrix is a matrix in which all the items are arranged in row and column, and all the weights for between the items are elements. Then, the weight matrix setting unit 14 sets a sparse weight matrix in which an element corresponding to the intersection of a specific item and an item selected as a similar item to the specific item is a nonzero element and the others are zero elements. That is to say, as shown by hatching in the weight matrix w of FIGS. 4Aa and 4B, the weight matrix setting unit 14 sets a weight matrix w in which only some of the elements are nonzero elements.

The learning unit 15 (learning unit) learns the values of the elements of the weight matrix set as described above, that is, the values of the weights for between items set to nonzero elements by using the user-item matrix stored in the data storing unit 17. Specifically, in the same manner as described before, as shown in FIG. 2, the learning unit 15 learns the values of the nonzero elements of the weight matrix w so that the product of the user-item matrix A that is a sparse matrix and the weight matrix x becomes the user-item matrix A' that is substantially identical to the user-item matrix A. Then, the learning unit 15 stores the generated weight matrix w as a model as the learning result into the model storing unit 18.

The estimating unit 16 predicts an item to recommend to the user from a newly acquired user-item matrix by using the generated weight matrix w as described above. For example, the estimating unit 16 multiplies the user-item matrix as shown in the left view of FIG. 1 by the weight matrix w generated by learning to predict the matrix as shown in the right view of FIG. 1, and recommends an item whose element has changed from “0” to “1” to the user.

[Operation]

Next, an operation of the above information processing system 10 will be described majorly with reference to a flowchart of FIG. 10. First, the information processing system 10 retrieves a user-item matrix from the data storing unit 17, and selects one item as a specific item (step S1). Then, the information processing system 10 selects some users from among users corresponding to all elements in a column corresponding to the specific item in the user-item matrix (step S2). At the time, for example, the information processing system 10 extracts users corresponding to elements of value “1”, that is, nonzero elements from among the elements in the column corresponding to the specific item, and further selects only some users therefrom. Then, the information processing system 10 extracts elements corresponding to the selected users from among the elements in the column corresponding to the specific item, and also extracts elements corresponding to the selected users from among elements in a column corresponding to another item.

Subsequently, the information processing system 10 compares the extracted elements in the column corresponding to the specific item with the extracted elements in the column corresponding to the other item, and calculates the degree of similarity between the specific item and the other item (step S3). At the time, the information processing system 10 calculates the degrees of similarity between items until finishing comparison of all the other items with the specific item (step 4, Yes).

Subsequently, the information processing system 10 selects another item similar to the specific item based on the calculated degrees of similarity (step S5). For example, the information processing system 10 selects a plurality of items as the similar items in descending order of the degree of similarity of the other items to the specific item.

After that, the information processing system 10 changes the specific item to another specific item, calculates the degree of similarity of the other items to the post-change specific item in the same manner as described above, and selects similar items. Then, until finishing selection of similar items for all the items, respectively, the information processing system 10 changes the specific item and repeats the abovementioned processing (step S6, Yes). At the time, the information processing system 10 selects users different from previously selected users every time changing the specific item, but the same users as some or all of the previously selected users may be selected.

Subsequently, the information processing system 10 sets zero elements and nonzero elements of the weight matrix w based on the similar items selected for each of the items as described above (step S7). Specifically, the information processing system 10 sets a sparse weight matrix in which elements corresponding to the intersection of a specific item and a selected item determined to be similar to the specific item are nonzero elements and the others are zero elements.

Figure 2:
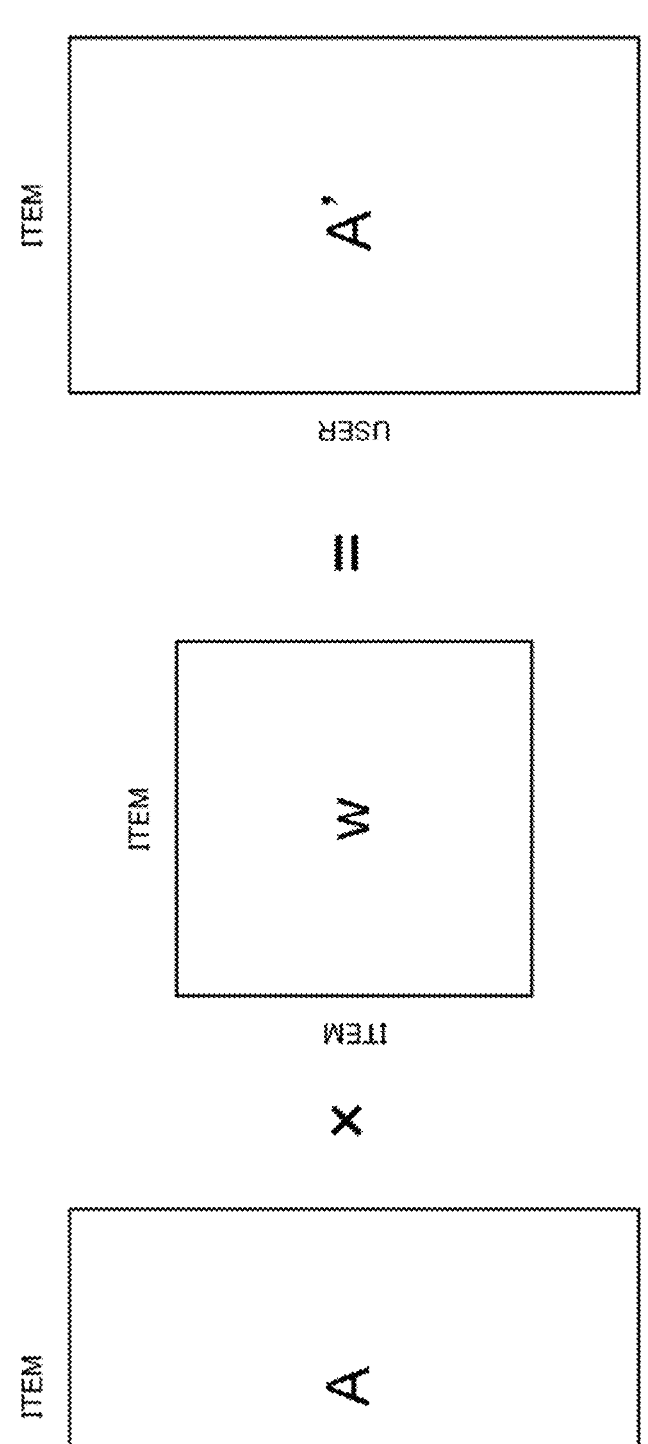
FIG. 2 is a view showing an image of processing associated with learning of the user-item matrix.
Figure 3A:
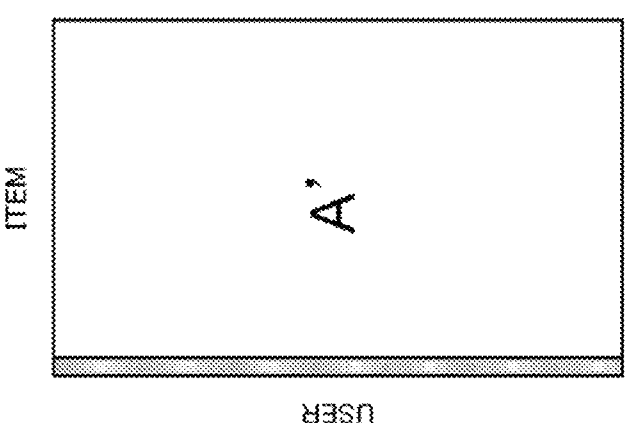
FIG. 3A is a view showing an image of processing associated with learning of the user-item matrix.
Figure 3A:
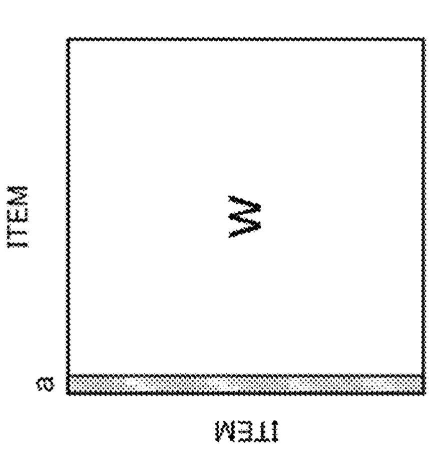
Figure 3A:
Figure 3A:
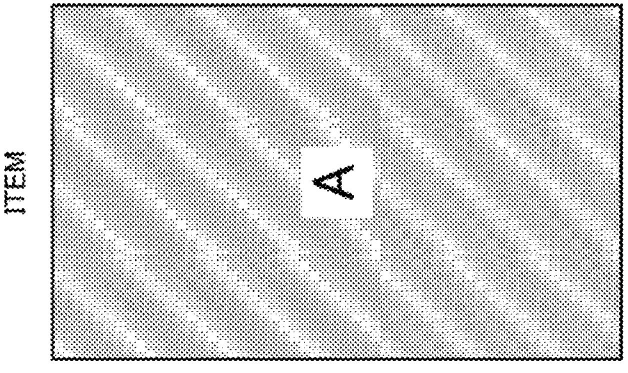

After that, the information processing system 10 learns the values of the elements of the weight matrix w set as described above, that is, the values of weights for between items set to a nonzero element by using the user-item matrix (step S8). Specifically, the information processing system 10 learns the values of the nonzero elements of the weight matrix w so that the product of the user-item matrix A that is a sparse matrix and the weight matrix w becomes the user-item matrix A' substantially identical to the user-item matrix A as shown in FIG. 2.

Further, the information processing system 10 predicts an item to recommend to the user from a newly acquired user-item matrix by using the weight matrix w generated as described above as necessary. For example, the information processing system 10 multiplies the user-item matrix as shown in the left view of FIG. 1 by the weight matrix w to predict a matrix as shown in the right view of FIG. 1, and recommends an item whose element has changed from "0" to "1" to the user.

As described above, in this example embodiment, elements for each item used at the time of calculating the degree of similarity between items are only elements corresponding to some of the users. Consequently, when compared with the SLIM described above, it is possible to reduce the amount of calculation at the time of calculating the degree of similarity and it is possible to shorten the learning time. For example, in this example embodiment, it is possible to increase the processing speed by 5 times as compared with the SLIM by selecting the number of users of about 20% of the total number of users. At the time, items similar to a specific item selected in descending order of the degree of similarity are different by 50% or more as compared with in the case of the SLIM, but when compared with the case of recommending an item by using a model learned by the SLIM, the accuracy is reduced only by 0.7% and there is almost no deterioration in learning performance.

FIG. 9 shows graphs in which the degrees of similarity of the respective other items to a specific item are arranged in order of the degree of similarity. In FIG. 9, the upper view is a graph in this example embodiment, and the lower view is a graph in the SLIM. In this case, an item with the degree of similarity located on the left side of a threshold value shown by a dotted line is selected as an item similar to the specific item, and the result shows that items around the threshold value often differ between this example embodiment and the SLIM. Therefore, in this example embodiment, items with high degrees of similarity that is necessary for learning are less changed as compared with the SLIM, so that the deterioration of the learning performance can be suppressed as described above.

Further, in the method of this example embodiment, selected users are changed at the time of calculating the degree of similarity between items. Therefore, it is possible to learn by reflecting an action by every user, and it is possible to further shorten the learning time while suppressing the deterioration of the learning performance.

Second Example Embodiment

Figure 11:
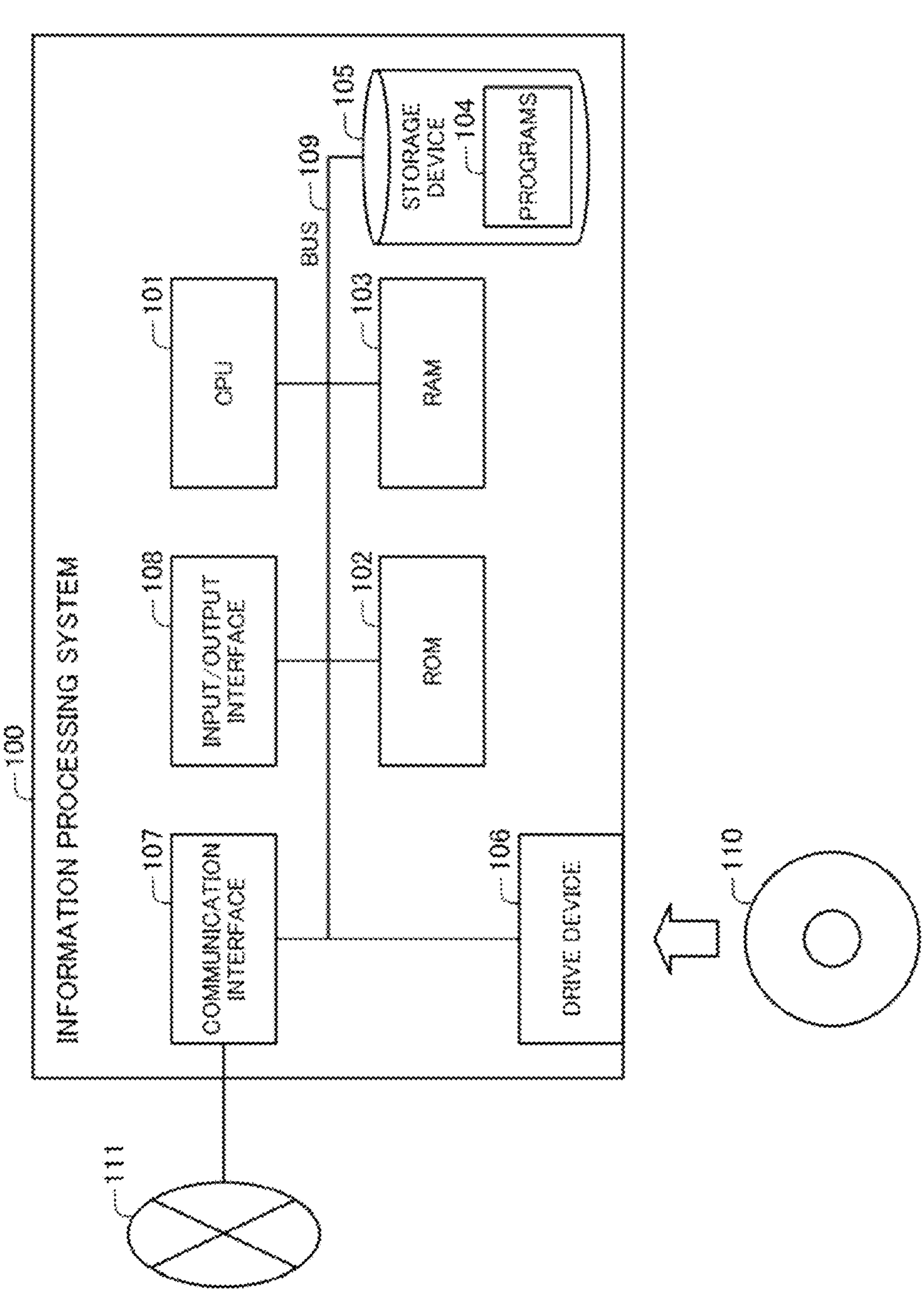
FIG. 11 is a block diagram showing a hardware configuration of an information processing system in a second example embodiment of the present invention.
Figure 12:
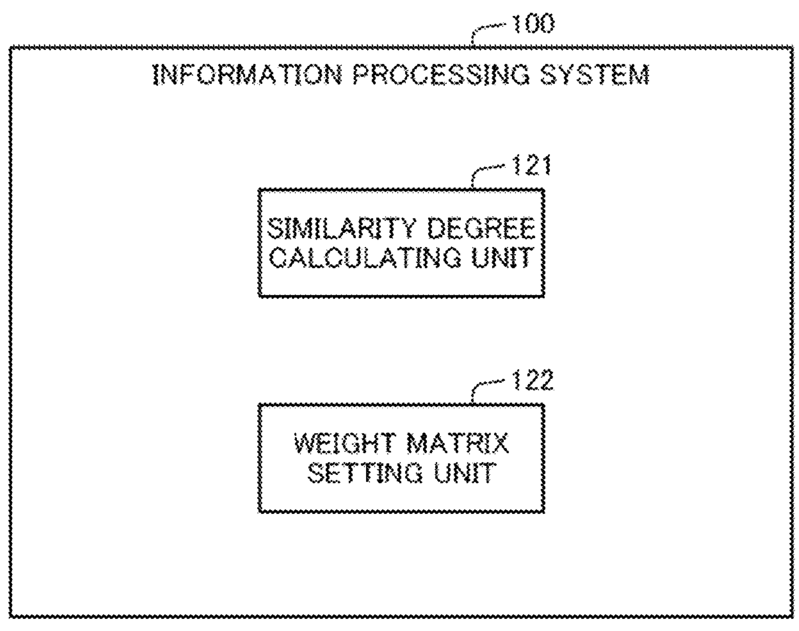
FIG. 12 is a block diagram showing a configuration of the information processing system in the second example embodiment of the present invention.
Figure 13:
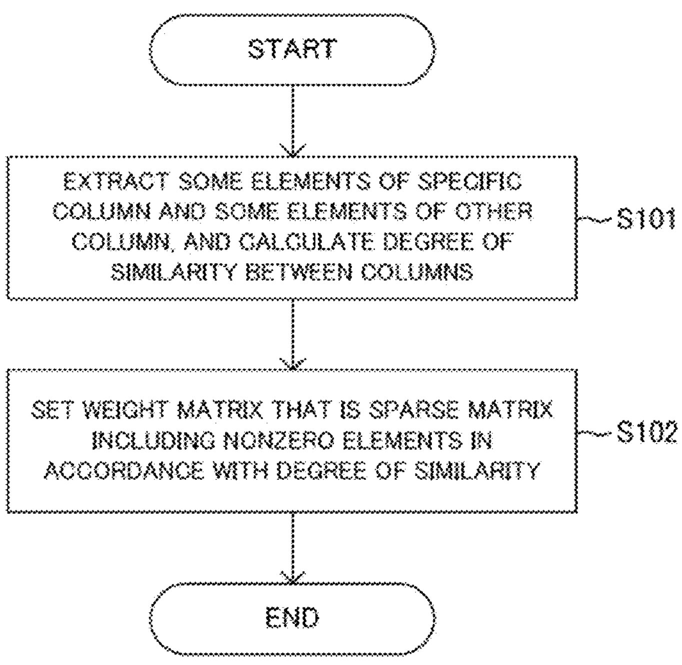
FIG. 13 is a flowchart showing an operation of the information processing system in the second example embodiment of the present invention.

Next, a second example embodiment of the present invention will be described with reference to FIGS. 11 to 13. FIGS. 11 to 12 are block diagrams showing a configuration of an information processing system in the second example embodiment, and FIG. 13 is a flowchart showing an operation of the information processing system. This example embodiment shows the overview of the configuration of the information processing system and the information processing method descried in the above example embodiment.

First, with reference to FIG. 11, a hardware configuration of an information processing system 100 in this example embodiment will be described. The information processing system 100 is configured by a generally-used information processing apparatus and is provided with, as an example, a hardware configuration as described below including;

- a CPU (Central Processing Unit) 101 (arithmetic logic unit);
- a ROM (Read Only Memory) 102 (storage unit);
- a RAM (Random Access Memory) 103 (storage unit) programs 104 loaded to the RAM 103;
- a storage device 105 for storing the programs 104;
- a drive device 106 reading from and writing into a storage medium 110 outside the information processing apparatus;
- a communication interface 107 connected with a communication network 111 outside the information processing apparatus;
- an input/output interface 108 inputting and outputting data; and
- a bus 109 connecting the respective components.

Then, the information processing system 100 can structure and include a similarity degree calculating unit 121 and a weight matrix setting unit 122 shown in FIG. 12 by acquisition and execution of the programs 104 by the CPU 101. For example, the programs 104 are stored in the storage device 105 or the ROM 102 in advance, and are loaded into the RAM 103 and executed by the CPU 101 as necessary. Moreover, the programs 104 may be supplied to the CPU 101 via the communication network 111, or may be stored in the storage medium 110 in advance and retrieved and supplied to the CPU 101 by the drive device 106. However, the similarity degree calculating unit 121 and the weight matrix setting unit 122 may be structured by a dedicated electronic circuit for realizing the units.

FIG. 11 shows an example of the hardware configuration of the information processing apparatus serving as the information processing system 100, and the hardware configuration of the information processing apparatus is not limited to the abovementioned case. For example, the information processing apparatus may include part of the abovementioned configuration, such as excluding the drive device 106.

Then, the information processing system 100 executes an information processing method shown in the flowchart of FIG. 13 by the functions of the similarity degree calculating unit 121 and the weight matrix setting unit 122 structured by the programs as described above.

As shown in FIG. 13, the information processing system 100 executes an information processing method for setting a weight matrix generated by learning using a target matrix that is a matrix including action statuses on an item in a plurality of setting statuses as elements of a column, the weight matrix including a weight corresponding to an intersection of items as an element, the weight matrix being multiplied by the target matrix, the information processing method comprising processes of:

- extracting, from each column of the target matrix, some elements from among all the elements of the column, and calculating a degree of similarity between the items based on the some elements of the each column (step S101); and
- setting the weight matrix that is a sparse matrix in which a nonzero element is set based on the degree of similarity (step S102).

According to the present invention, with the configuration as described above, elements for each item used at the time of calculating the degree of similarity between items are only elements corresponding to some of the setting statuses.

Therefore, it is possible to reduce the amount of calculation at the time of calculating the degree of similarity, and it is possible to shorten the learning time.

The above program can be stored by using various types of non-transitory computer-readable mediums and supplied to a computer. The non-transitory computer-readable mediums include various types of tangible storage mediums. Examples of the non-transitory computer-readable mediums include a magnetic recording medium (for example, a flexible disk, a magnetic tape, a hard disk drive), a magnetooptical recording medium (for example, a magnetooptical disk), a CD-ROM (Read Only Memory), a CD-R, a CD-R/W, and a semiconductor memory (for example, a mask ROM, a PROM (Programmable ROM), an EPROM (Erasable ROM), a flash ROM, a RAM (Random Access Memory)). Moreover, the program may be supplied to a computer by various types of transitory computer-readable mediums. Examples of the transitory computer-readable mediums include an electric signal, an optical signal, and an electromagnetic wave. The transitory computer-readable mediums can supply the program to a computer via a wired communication path such as an electric wire and an optical fiber or via a wireless communication path.

Although the present invention has been described above with reference to the example embodiments, the present invention is not limited to the example embodiments. The configurations and details of the present invention can be changed in various manners that can be understood by one skilled in the art within the scope of the present invention. Moreover, at least one or more functions of the functions included by the information processing system may be executed by an information processing apparatus installed and connected in any place on the network, that is, may be executed by so-called cloud computing.

SUPPLEMENTARY NOTES

The whole or part of the example embodiments disclosed above can be described as the following supplementary notes. Below, the overview of the configurations of an information processing method, an information processing system, and a program will be described. However, the present invention is not limited to the following configurations.

(Supplementary Note 1)

An information processing method for setting a weight matrix generated by learning using a target matrix that is a matrix including an action status on an item in each of a plurality of setting statuses as an element of a column, the weight matrix including a weight corresponding to an intersection of items as an element, the weight matrix being multiplied by the target matrix, the information processing method comprising:

extracting, from each column of the target matrix, some elements from among all elements of the column, and calculating a degree of similarity between the items based on the some elements of the each column; and setting the weight matrix that is a sparse matrix including a nonzero element based on the degree of similarity.

(Supplementary Note 2)

The information processing method according to Supplementary Note 1, comprising extracting some elements from a specific column of the target matrix and also extracting some elements from each of other columns different from the specific column of the target matrix, and calculating a degree of similarity between a specific item corresponding to the specific column and each of other items corresponding to the other columns based on the some elements of the specific column and the some elements of each of the other columns.

(Supplementary Note 3)

The information processing method according to Supplementary Note 2, comprising extracting some elements of the specific column and some elements of each of the other columns corresponding to target setting statuses that are some of all the setting statuses, and calculating a degree of similarity between the specific item and each of the other items based on the some elements of the specific column and the some elements of each of the other columns.

(Supplementary Note 4)

The information processing method according to Supplementary Note 3, comprising calculating a degree of similarity between the specific item and each of the other items based on elements that are some nonzero elements of the elements of the specific column and the some elements of each of the other columns.

(Supplementary Note 5)

The information processing method according to Supplementary Note 4, comprising calculating a degree of similarity between the specific item and each of the other items based on some elements of the nonzero elements of the specific column and the some elements of each of the other columns.

(Supplementary Note 6)

The information processing method according to any of Supplementary Notes 3 to 5, comprising changing the specific element and also changing the target setting statuses, extracting some elements of the specific column after changed and some elements of each of the other columns different from the specific column corresponding to the target setting statuses after changed, and calculating a degree of similarity between the specific item and each of the other items based on the some elements of the specific column and the some elements of each of the other columns.

(Supplementary Note 7)

The information processing method according to any of Supplementary Notes 1 to 6, comprising learning a value of the nonzero element of the weight matrix including the nonzero element so that a product of the target matrix and the weight matrix becomes almost identical to the target matrix.

(Supplementary Note 8)

The information processing method according to any of Supplementary Notes 1 to 7, wherein the target matrix is a matrix including, as an element, a value representing presence or absence of a preset action on the item by a user that is the setting status.

(Supplementary Note 9)

An information processing system that sets a weight matrix generated by learning using a target matrix that is a matrix including an action status on an item in each of a plurality of setting statuses as an element of a column, the weight matrix including a weight corresponding to an intersection of items as an element, the weight matrix being multiplied by the target matrix, the information processing system comprising:

a similarity degree calculating unit configured to extract, from each column of the target matrix, some elements from among all elements of the column, and calculate a degree of similarity between the items based on the some elements of the each column; and a weight matrix setting unit configured to set the weight matrix that is a sparse matrix including a nonzero element based on the degree of similarity.

(Supplementary Note 10)

The information processing system according to Supplementary Note 9, wherein the similarity degree calculating unit is configured to extract some elements from a specific column of the target matrix and also extract some elements from each of other columns different from the specific column of the target matrix, and calculate a degree of similarity between a specific item corresponding to the specific column and each of other items corresponding to the other columns based on the some elements of the specific column and the some elements of each of the other columns.

(Supplementary Note 11)

The information processing system according to Supplementary Note 10, wherein the similarity degree calculating unit is configured to extract some elements of the specific column and some elements of each of the other columns corresponding to target setting statuses that are some of all the setting statuses, and calculate a degree of similarity between the specific item and each of the other items based on the some elements of the specific column and the some elements of each of the other columns.

(Supplementary Note 12)

The information processing system according to Supplementary Note 11, wherein the similarity degree calculating unit is configured to calculate a degree of similarity between the specific item and each of the other items based on elements that are some nonzero elements of the elements of the specific column and the some elements of each of the other columns.

(Supplementary Note 13)

The information processing system according to Supplementary Note 12, wherein the similarity degree calculating unit is configured to calculate a degree of similarity between the specific item and each of the other items based on some elements of the nonzero elements of the specific column and the some elements of each of the other columns.

(Supplementary Note 14)

The information processing system according to any of Supplementary Notes 11 to 13, wherein the similarity degree calculating unit is configured to change the specific element and also change the target setting statuses, extract some elements of the specific column after changed and some elements of each of the other columns different from the specific column corresponding to the target setting statuses after changed, and calculate a degree of similarity between the specific item and each of the other items based on the some elements of the specific column and the some elements of each of the other columns.

(Supplementary Note 15)

The information processing system according to any of Supplementary Notes 9 to 14, comprising a learning unit configured to learn a value of the nonzero element of the weight matrix including the nonzero element so that a product of the target matrix and the weight matrix becomes almost identical to the target matrix.

(Supplementary Note 16)

A non-transitory computer-readable storage medium in which a computer program is stored, the computer program comprising instructions for causing an information processing apparatus setting a weight matrix that is generated by learning using a target matrix that is a matrix including an action status on an item in each of a plurality of setting statuses as an element of a column, that includes a weight corresponding to an intersection of items as an element, and that is multiplied by the target matrix, to realize:

a similarity degree calculating unit configured to extract, from each column of the target matrix, some elements from among all elements of the column, and calculate a degree of similarity between the items based on the some elements of the each column; and a weight matrix setting unit configured to set the weight matrix that is a sparse matrix including a nonzero element based on the degree of similarity.

DESCRIPTION OF NUMERALS

10 information processing system
11 user selecting unit
12 similarity degree calculating unit
13 similar item selecting unit
14 weight matrix setting unit
15 learning unit
16 estimating unit
17 data storing unit
18 model storing unit
100 information processing system
101 CPU
102 ROM
103 RAM
104 programs
105 storage device
106 drive device
107 communication interface
108 input/output interface
109 bus
110 storage medium
111 communication network
121 similarity degree calculating unit
122 weight matrix setting unit

What is claimed is:

1. An information processing method comprising:

at a computer system with memory and one or more processors:

extracting, by the one or more processors, from each column of a target matrix, a subset of elements from among all elements of the column, wherein the target matrix is a matrix including an action status on an item in each of a plurality of setting statuses as an element of a column;

calculating a degree of similarity between the items based on the subset of elements of the each column;

setting a weight matrix including a weight corresponding to an intersection of items as an element, wherein the weight matrix is a sparse matrix including a nonzero element based on the degree of similarity and the weight matrix is multiplied by the target matrix;

learning a value of the nonzero element of the weight matrix so that a product of the target matrix and the weight matrix becomes substantially identical to the target matrix; and predicting an item to recommend to a user from a newly acquired user-item matrix by using the weight matrix.

2. The information processing method according to claim 1, further comprising:

extracting a subset of elements from a specific column of the target matrix;

extracting a subset of elements from each of other columns different from the specific column of the target matrix; and calculating a degree of similarity between a specific item corresponding to the specific column and each of other items corresponding to the other columns based on the subset of elements of the specific column and the subset of elements of each of the other columns.

3. The information processing method according to claim 2, further comprising:

extracting a subset of elements of the specific column and a subset of elements of each of the other columns corresponding to target setting statuses that are a subset of all the setting statuses; and calculating a degree of similarity between the specific item and each of the other items based on the subset of elements of the specific column and the subset of elements of each of the other columns.

4. The information processing method according to claim 3, further comprising:

calculating a degree of similarity between the specific item and each of the other items based on elements that are a subset of nonzero elements of the elements of the specific column and the subset of elements of each of the other columns.

5. The information processing method according to claim 4, further comprising:

calculating a degree of similarity between the specific item and each of the other items based on a subset of elements of the nonzero elements of the specific column and the subset of elements of each of the other columns.

6. The information processing method according to claim 3, further comprising:

changing the specific item and the target setting statuses;

extracting a subset of elements of the specific column after changing the specific item and the targeting statuses and a subset of elements of each of the other columns different from the specific column corresponding to the target setting statuses after the changing; and calculating a degree of similarity between the specific item and each of the other items based on the subset of elements of the specific column and the subset of elements of each of the other columns.

7. The information processing method according to claim 1, further comprising:

learning a value of the nonzero element of the weight matrix including the nonzero element so that a product of the target matrix and the weight matrix becomes substantially identical to the target matrix.

8. The information processing method according to claim 1, wherein:

the target matrix is a matrix including, as an element, a value representing presence or absence of a preset action on the item by a user that is the setting status.

9. An information processing system comprising:

at least one memory configured to store instructions; and at least one processor configured to execute the instructions to:

extract, from each column of a target matrix, a subset of elements from among all elements of the column, wherein the target matrix is a matrix including an action status on an item in each of a plurality of setting statuses as an element of a column;

calculate a degree of similarity between the items based on the subset of elements of the each column;

set a weight matrix including a weight corresponding to an intersection of items as an element, wherein the weight matrix is a sparse matrix including a nonzero element based on the degree of similarity and the weight matrix is multiplied by the target matrix;

learn a value of the nonzero element of the weight matrix so that a product of the target matrix and the weight matrix becomes substantially identical to the target matrix; and predict an item to recommend to a user from a newly acquired user-item matrix by using the weight matrix.

10. The information processing system according to claim 9, wherein the at least one processor is further configured to execute the instructions to:

extract a subset of elements from a specific column of the target matrix;

extract a subset of elements from each of other columns different from the specific column of the target matrix; and calculate a degree of similarity between a specific item corresponding to the specific column and each of other items corresponding to the other columns based on the subset of elements of the specific column and the subset of elements of each of the other columns.

11. The information processing system according to claim 10, wherein the at least one processor is further configured to execute the instructions to:

extract a subset of elements of the specific column and a subset of elements of each of the other columns corresponding to target setting statuses that are a subset of all the setting statuses; and calculate a degree of similarity between the specific item and each of the other items based on the subset of elements of the specific column and the subset of elements of each of the other columns.

12. The information processing system according to claim 11, wherein the at least one processor is further configured to execute the instructions to:

calculate a degree of similarity between the specific item and each of the other items based on elements that are a subset of nonzero elements of the elements of the specific column and the subset of elements of each of the other columns.

13. The information processing system according to claim 12, wherein the at least one processor is further configured to execute the instructions to:

calculate a degree of similarity between the specific item and each of the other items based on a subset of elements of the nonzero elements of the specific column and the subset of elements of each of the other columns.

14. The information processing system according to claim 11, wherein the at least one processor is further configured to execute the instructions to:

change the specific item and the target setting statuses;

extract a subset of elements of the specific column after changing the specific item and the target setting statuses and a subset of elements of each of the other columns different from the specific column corresponding to the target setting statuses after the changing; and calculate a degree of similarity between the specific item and each of the other items based on the subset of elements of the specific column and the subset of elements of each of the other columns.

15. The information processing system according to claim 9, wherein the at least one processor is further configured to execute the instructions to:

learn a value of the nonzero element of the weight matrix including the nonzero element so that a product of the target matrix and the weight matrix becomes substantially identical to the target matrix.

16. A non-transitory computer-readable storage medium in which a computer program is stored, the computer program comprising instructions for causing an information processing apparatus to execute:

a process to extract, from each column of a target matrix, a subset of elements from among all elements of the column, wherein the target matrix is a matrix including an action status on an item in each of a plurality of setting statuses as an element of a column;

a process to calculate a degree of similarity between the items based on the subset of elements of the each column;

a process to set a weight matrix including a weight corresponding to an intersection of items as an element, wherein the weight matrix is a sparse matrix including a nonzero element based on the degree of similarity and the weight matrix is multiplied by the target matrix;

a process to learn a value of the nonzero element of the weight matrix so that a product of the target matrix and the weight matrix becomes substantially identical to the target matrix; and a process to predict an item to recommend to a user from a newly acquired user-item matrix by using the weight matrix.

17. The non-transitory computer-readable storage medium according to claim 16, wherein the computer program comprises instructions for causing an information processing apparatus to further execute:

a process to extract a subset of elements from a specific column of the target matrix;

a process to extract a subset of elements from each of other columns different from the specific column of the target matrix; and a process to calculate a degree of similarity between a specific item corresponding to the specific column and each of other items corresponding to the other columns based on the subset of elements of the specific column and the subset of elements of each of the other columns.

18. The non-transitory computer-readable storage medium according to claim 17, wherein the computer program comprises instructions for causing an information processing apparatus to further execute:

a process to extract a subset of elements of the specific column and a subset of elements of each of the other columns corresponding to target setting statuses that are a subset of all the setting statuses; and a process to calculate a degree of similarity between the specific item and each of the other items based on the subset of elements of the specific column and the subset of elements of each of the other columns.

19. The non-transitory computer-readable storage medium according to claim 16, wherein the computer program comprises instructions for causing an information processing apparatus to further execute:

a process to learn a value of the nonzero element of the weight matrix including the nonzero element so that a product of the target matrix and the weight matrix becomes substantially identical to the target matrix.

20. The non-transitory computer-readable storage medium according to claim 16, wherein:

the target matrix is a matrix including, as an element, a value representing presence or absence of a preset action on the item by a user that is the setting status.

* * * * *